(12) United States Patent
Wilson et al.

(10) Patent No.: US 8,651,812 B2
(45) Date of Patent: Feb. 18, 2014

(54) MACHINE SUCH AS A GAS TURBINE ENGINE

(75) Inventors: Robert E. Wilson, Derby (GB); Jonathan E. Holt, Derby (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 1098 days.

(21) Appl. No.: 12/588,084

(22) Filed: Oct. 2, 2009

(65) Prior Publication Data

US 2010/0129214 A1   May 27, 2010

(30) Foreign Application Priority Data

Nov. 21, 2008   (GB) .................................... 0821239.1

(51) Int. Cl.
*B64C 11/38*   (2006.01)
*B64C 11/44*   (2006.01)

(52) U.S. Cl.
USPC ........................................ 416/42; 416/157 R

(58) Field of Classification Search
USPC .............................. 416/1, 31, 42, 46, 128, 130
See application file for complete search history.

(56) References Cited

U.S. PATENT DOCUMENTS

| | | | | |
|---|---|---|---|---|
| 4,555,219 A | * | 11/1985 | Jeffery et al. | 416/158 |
| 4,936,746 A | * | 6/1990 | Mayo et al. | 416/46 |
| 5,174,718 A | * | 12/1992 | Lampeter et al. | 416/48 |
| 5,183,387 A | * | 2/1993 | Huggett et al. | 416/147 |
| 5,213,471 A | * | 5/1993 | Miller et al. | 416/44 |
| 5,242,265 A | | 9/1993 | Hora et al. | |
| 6,422,816 B1 | * | 7/2002 | Danielson | 416/35 |
| 6,811,376 B2 | * | 11/2004 | Arel et al. | 416/46 |
| 2009/0180883 A1 | * | 7/2009 | Muhlbauer | 416/156 |

FOREIGN PATENT DOCUMENTS

| | | |
|---|---|---|
| DE | 10 2006 023 411 A1 | 11/2007 |
| EP | 0 380 278 A2 | 8/1990 |
| GB | 2 071 780 A | 9/1981 |
| GB | 2 071 781 A | 9/1981 |
| GB | 2 151 712 A | 7/1985 |
| WO | WO 91/09775 A1 | 7/1991 |

* cited by examiner

*Primary Examiner* — Nathaniel Wiehe
*Assistant Examiner* — Woody A Lee, Jr.
(74) *Attorney, Agent, or Firm* — Oliff PLC

(57) ABSTRACT

A engine such as a gas turbine engine has a bladed rotor 24 having variable pitch blades 8. In normal operation, the pitch angle of the blades 8 is controlled by a primary pitch control system. A back-up system is provided for controlling the blades 8, for example to displace them to a feathered condition, in the event of failure of the primary pitch control system. The back-up system comprises a pump 32 mounted on the rotor 24, and driven by relative rotation between the rotor 24 and a contra-rotating rotor 23. In response to a failure signal on a conduit 48, the pump delivers hydraulic fluid under pressure to a secondary actuator 30, which acts on the blade 8.

12 Claims, 2 Drawing Sheets

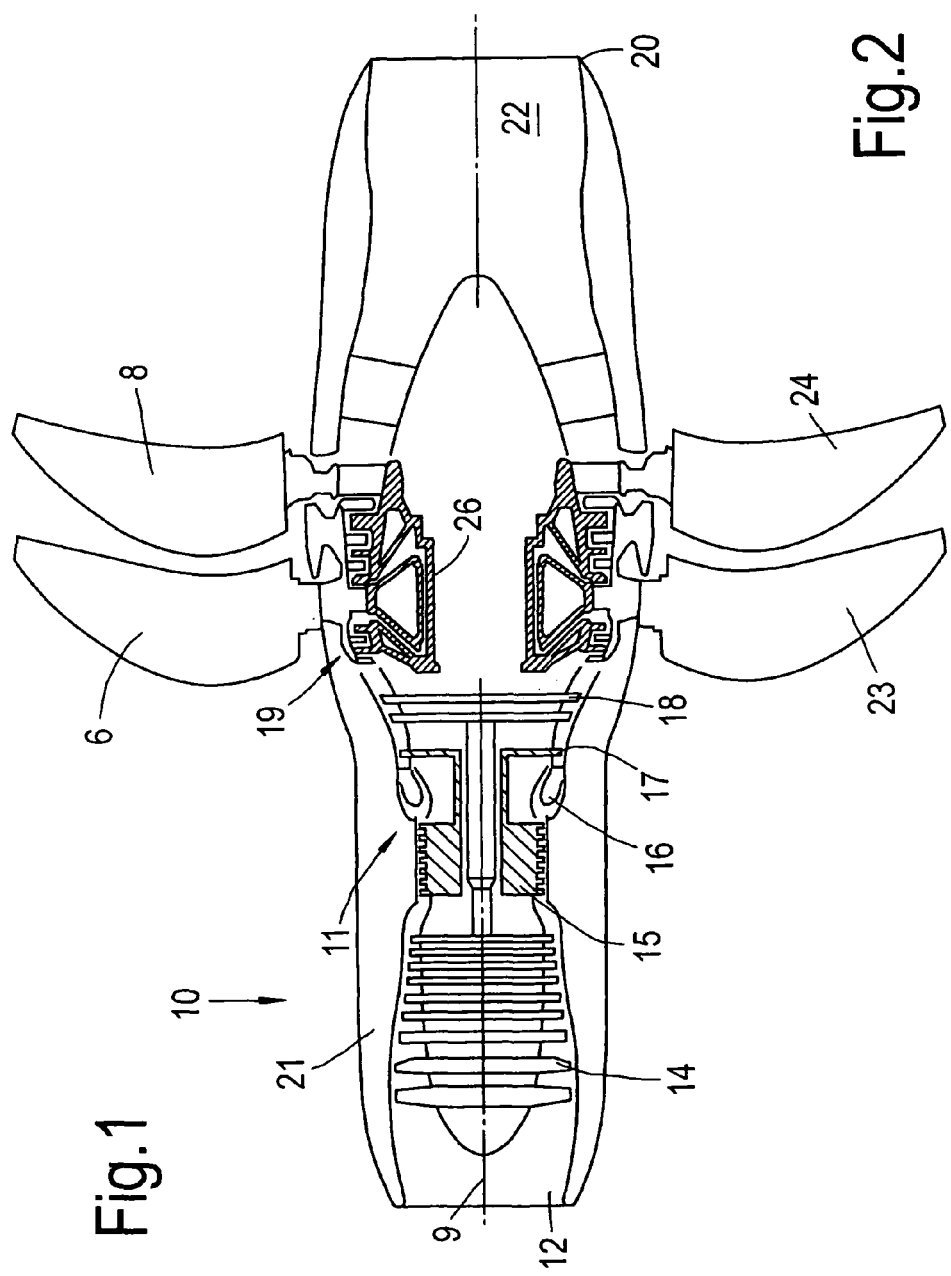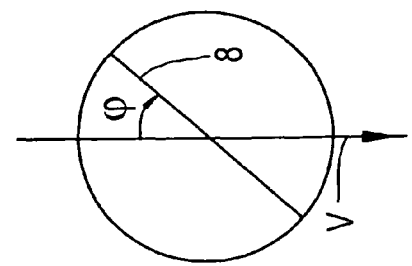

MACHINE SUCH AS A GAS TURBINE ENGINE

This invention relates to a variable pitch rotor arrangement comprising a bladed rotor provided with a primary actuator for displacing a component of the rotor under the control of primary control means. The present invention is particularly, although not exclusively, concerned with such a variable pitch rotor arrangement in the form of a gas turbine engine, in which the bladed rotor is provided with variable pitch blades.

A known type of gas turbine engine, particularly for use in aircraft propulsion, is a propeller gas turbine engine or turboprop. This works in conventional form, whereby a core engine comprising compressors, combustion equipment and turbines drives one or more propeller rotor stages via a shaft from a free power, or low-pressure, turbine. The propeller rotor stage or stages may be situated at the front or rear of the engine, with respect to the direction of airflow through the engine. The propeller rotor blades extend radially outwardly beyond the core engine. Each blade is of variable pitch, and for this purpose is pivotable about its own longitudinal axis so as to change its angle of attack relative to the airflow. This variable pitch enables more efficient operation at a variety of operating conditions since the incident angle between the airflow and the blade surface can be optimised for the given airspeed and operating mode of the engine and aircraft.

There are benefits to providing two stages of propeller rotor blades that rotate in opposite directions and are connected by a differential gearbox. This contra-rotation ensures that airflow leaving the stages is substantially parallel to that entering the stages.

Serious consequences can ensue if there is a failure in the control of the blade pitch. It is therefore known to provide back-up systems which can assume control of blade pitch the event of failure of the main pitch control system. Such back-up systems can provide operative pitch control in that they can enable control of the blade pitch over at least part of the normal range of blade movement. In some circumstances, back-up systems cause the propeller rotor to assume a failsafe configuration in which the blades are feathered, ie are generally aligned with the direction of incident air flow.

A disadvantage of current back-up systems is that they utilise at least part of the main pitch control system, and consequently are not fully independent. As a result, failure of components which are common to both the main and back-up control systems results in total inability to control the blade pitch.

According to the present invention there is provided a variable pitch rotor arrangement comprising a rotor provided with a primary actuator for displacing a component of the rotor under the control of primary control means, the arrangement further comprising:

a secondary actuator mounted on the rotor for displacing the component;

power generating means mounted on the rotor, the power generating means being drivable to generate power by rotation of the rotor relative to a further part of the arrangement;

secondary control means responsive to a failure signal representing operative failure of the primary actuator, the secondary control means arranged to deliver power from the power generating means to the secondary actuator to displace the component.

In the context of the present invention, "operative failure" means any failure, including failure in the primary actuator or the primary control means, which results in failure of the primary actuator to displace the component in the desired manner.

The power generating means may comprise an electrical generator for supplying electrical power to an electrical actuator.

Alternatively, the power generating means may be a hydraulic pump, and the secondary actuator may be a hydraulic actuator. The pump may be a swashplate pump, in which case the pump may be permanently driven when the rotor rotates relatively to the further part of the arrangement. When operation of the secondary actuator is not required, for example if the primary actuator is operational, the swashplate of the pump may be in the "flat" or non-inclined orientation, in which the pump delivery is zero. In response to the failure signal, the secondary control means causes displacement of the swashplate to an inclined orientation to deliver hydraulic fluid under pressure to the secondary actuator.

The supply and delivery sides of the pump may be interconnected by a bypass duct provided with a pressure relief valve. Consequently, when the secondary actuator reaches an end position, increased pressure on the delivery side of the pump will cause the pressure relief valve to open, allowing hydraulic fluid to recirculate from the delivery side to the supply side of the pump.

The secondary control means may be responsive to a pressure in a hydraulic circuit of the primary actuator, so that the failure signal is constituted by a pressure in the hydraulic circuit below a predetermined value.

In one specific embodiment, the arrangement is a propulsive device, and the rotor is a bladed rotor, with the component being a variable pitch blade of the rotor which is displaceable by the primary and secondary actuators to vary the blade pitch. The secondary actuator may be operatively connected to the blade to displace the blade to a feathered condition in response to the failure signal.

The bladed rotor may be one of pair of contra-rotating rotors, in which case the power generating means may be driven by relative rotation between the two rotors of the pair. For example, where the power generating means is mounted on one of a pair of contra-rotating rotors, the power generating means may have an input shaft carrying a pinion which engages a ring gear mounted on the other rotor.

For a better understanding of the present invention, and to show more clearly how it may be carried into effect, reference will now be made, by way of example, to the accompanying drawings, in which:—

FIG. 1 is a sectional side view of a gas turbine engine having contra-rotating propeller stages;

FIG. 2 is a schematic end view of a variable pitch blade of one of the propeller stages of the gas turbine engine shown in FIG. 1;

Figure 3:
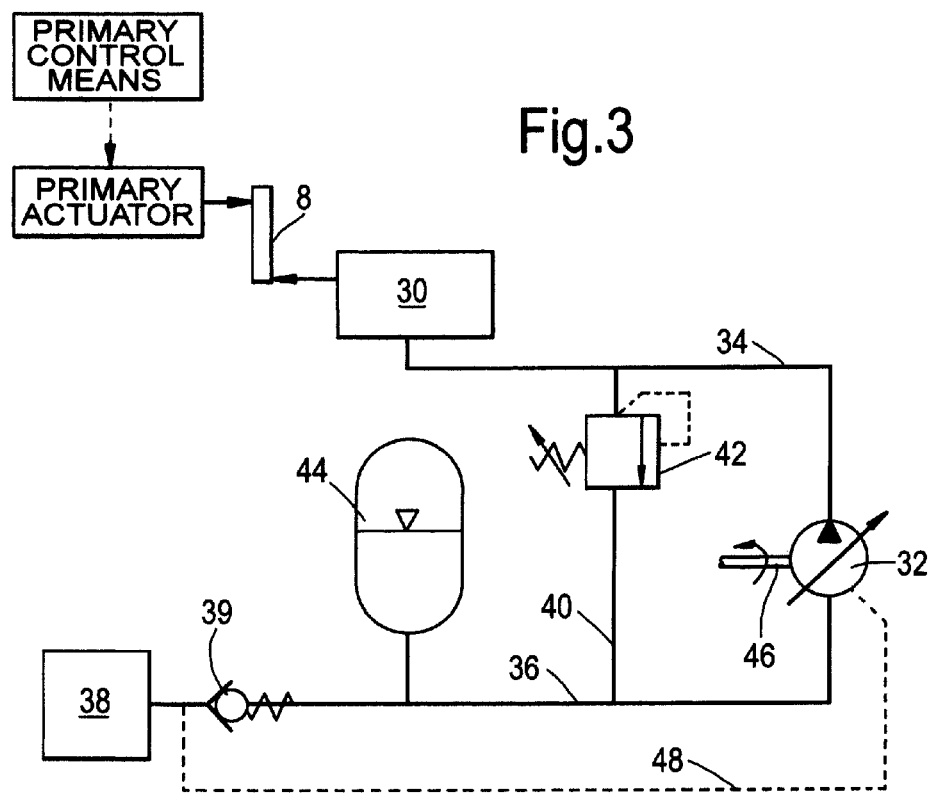
FIG. 3 is a schematic hydraulic circuit diagram representing back-up pitch control means for variable pitch blades of the gas turbine engine of FIG. 1.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12, the nozzle 20 and a core exhaust duct 22. The engine 10 also comprises two contra-rotating propeller stages 23, 24 attached to and driven by the free power turbine 19 via a shaft 26 and a differential gear box (not shown).

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propeller stages 23, 24 by suitable interconnecting shafts. The propeller stages 23, 24 normally provide the majority of the propulsive thrust. In the embodiments herein described the propellers 23, 24 rotate in opposite senses so that one rotates clockwise and the other anti-clockwise around the engine's rotational axis 9.

Each propeller stage 23, 24 comprises a rotor in the form of a bladed rotor having displaceable components in the form of variable pitch blades 6, 8.

Pitch angle is defined as shown in FIG. 2 wherein one of the blades 8 of the rotor 24 is shown, viewed from its radially outer end. The blade 8 is one of a set of rotor blades on the rotor 24, which rotates clockwise as viewed from the left. Thus, the blade 8 is travelling down the page as indicated by the arrow V. Pitch angle φ is measured clockwise from the top dead centre, ie from the blade travel direction V. The smaller the pitch angle φ, the finer the pitch; a larger pitch angle φ means a coarser pitch. When the pitch angle φ is such that air flow across the rotor 23, 24 creates minimal aerodynamic force on the blade 8 about the engine axis 9, the blade 8 is said to be "feathered".

The rotors 23, 24 are each provided with a primary actuator and primary control means for controlling the pitch of the blades 6, and 8 represented in FIG. 3. In addition, at least one of the rotors 23, 24 (the rear rotor 24 in the present embodiment) is provided with a back-up pitch control system represented in FIGS. 3 and 4.

The hydraulic circuit represented in FIG. 3 comprises a hydraulic actuator 30 (secondary actuator) which is connected, by an appropriate linkage, to the blades 8 of the rotor 24 so that operation of the actuator 30 (secondary actuator) displaces the blades 8 in unison about their lengthwise axes to vary their pitch angle. A pump 32 is connected at its delivery side to the actuator 30 by a conduit 34. The supply side of the pump 32 is connected by a conduit 36 to a hydraulic circuit 38 of the primary pitch control system. A non-return valve 39 is provided in the conduit 36 to prevent reverse flow along the conduit 36 towards the hydraulic circuit 38.

The supply and delivery sides of the pump 32 are interconnected by a bypass conduit 40 which extends between the conduits 34 and 36 and includes a pressure relief valve 42 responsive to the pressure in the conduit 34.

An accumulator 44 is in communication with the conduit 36.

The pump 32 is a swashplate pump having an input shaft 46. The inclination of the swashplate is adjusted by secondary control means which is responsive to a hydraulic pressure of the hydraulic circuit 38 of the primary pitch control system. This pressure is transmitted along a sensing conduit 48 to the secondary control means in the pump 32.

Figure 4:
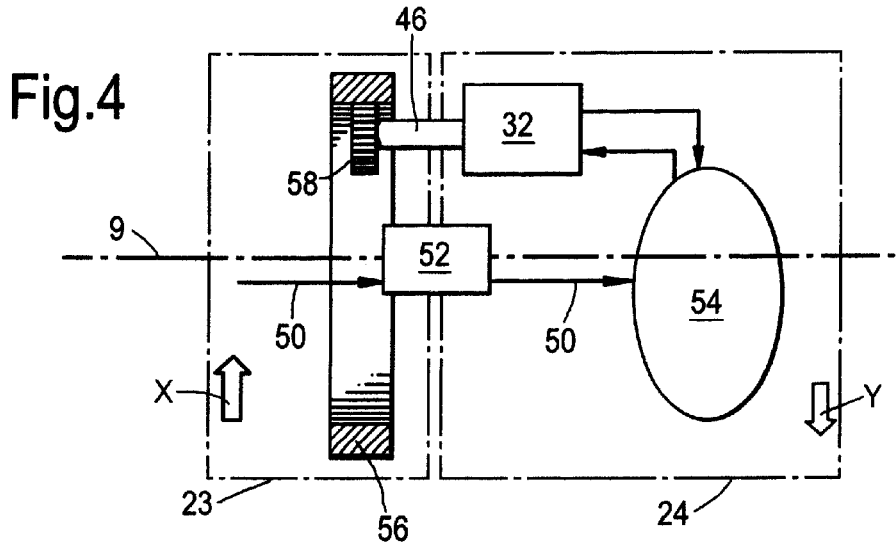
FIG. 4 is a schematic view of a pitch control arrangement including the hydraulic circuit of FIG. 3.

In FIG. 4, the rotors 23, 24 are represented only diagrammatically, their directions of rotation being indicated by arrows X and Y. Flow of hydraulic fluid from the hydraulic circuit of the primary pitch control system 38 is indicated by arrows 50. Hydraulic supply between the rotors 23 and 24 takes place through a muff coupling 52. The components of the hydraulic circuit represented in FIG. 3 apart from the pump 32, are generally represented at 54.

It will be appreciated from FIG. 4 that the pump 32 is mounted on the rotor 24 at a position away from the engine axis 9. A ring gear 56, centred on the engine axis 9, is mounted on the rotor 23, and so rotates with that rotor. The drive shaft 46 of the pump 32 carries a pinion 58 which meshes with internal teeth of the ring 56. It will therefore be appreciated that, as the rotors 23 and 24 rotate in opposite directions, the input shaft 46 is rotated to drive the pump 32.

In normal operation, with the pitch angles of the blades 6, 8 of the rotors 23, 24 controlled by the primary pitch control system, the pressure in the sensing conduit 48 is at a working level, above a predetermined threshold. While this pressure is maintained, the swashplate of the pump 32 is maintained in a non-inclined orientation, so that no hydraulic fluid is delivered by the pump 32 through the conduit 34 to the actuator 30. Consequently, the actuator 30 has no effect on the pitch angle of the blades 8. Nevertheless, by virtue of the engagement between the ring gear 56 and the pinion 58, the motor 32 is permanently driven whenever there is rotation between the rotors 23 and 24. Hydraulic fluid is present in the circuit represented in FIG. 3, including the accumulator 44, this hydraulic fluid being supplied from the hydraulic circuit 38 of the primary pitch control system through the non-return valve 39.

In the event of a failure of the primary pitch control system, there will, in most circumstances, be a loss of pressure in the hydraulic circuit 38. The non-return valve 39 retains fluid in the back-up hydraulic circuit shown in FIG. 3, and a failure signal, in the form of a reduced pressure below the predetermined threshold, will be transmitted along the sensing conduit 48 to the pump 32. This causes the secondary control means in the pump 32 to adjust the inclination of the swashplate of the pump to deliver fluid under pressure along the conduit 34 to the actuator 30. The actuator 30 will then operate to adjust the pitch of the blades 8 to a feathered condition. This condition corresponds to a limit position of the actuator 30. When the actuator 30 reaches the limit condition, the continued operation of the pump 32 causes the pressure in the conduit 34 to increase. This increased pressure is transmitted to the pressure relief valve 42 which, at a predetermined pressure, opens to permit the hydraulic fluid to recirculate through the bypass duct 40 to the conduit 36 and the supply side of the pump 32. Consequently, the actuator 30 remains locked in the position corresponding to feathering of the blades 8, while hydraulic fluid is recirculated by the pump 32.

Any leakage of hydraulic fluid from the circuit shown in FIG. 3 can be made up from the accumulator 44, even while the back-up system is operating. The back-up system can thus remain in use until the engine is stopped, or until the primary pitch control system is restored to operation. When the primary pitch control system is operational, any loss of hydraulic fluid from the back-up hydraulic circuit can be restored from the hydraulic circuit 38 of the primary pitch control system through the non-return valve 39. Furthermore, when the primary pitch control system returns to normal operation, fluid pressure is restored to the sensing conduit 48, which automatically causes the swashplate of the pump 32 to return to the non-inclined orientation, so that fluid ceases to be delivered through the conduit 34 to the actuator 30, and the feathering actuation of the blades 8 is terminated.

Although the sensing conduit 48 will transmit a failure signal to the pump 32 in the event of a loss of pressure in the hydraulic circuit 38 of the primary pitch control system, provision may also be made for manual or automatic release of pressure in the sensing conduit 48, so that the back-up system can be activated independently of any loss of pressure in the primary system.

The present invention thus provides a back-up system for blade pitch control which is fully independent of the primary pitch control system. The back-up system works across the mechanical interface between the contra-rotating rotors 23, 24. In particular, since the back-up system responds to loss of hydraulic pressure in the primary system, it will operate in the event that hydraulic supply to the primary system fails. The back-up system requires no transmission of electrical signals across rotating or static interfaces between components, and is consequently reliable in operation. Also, because the pump 32 is driven by relative rotation between the rotors 23 and 24, significant pressures can be generated enabling high actuation forces to be applied to the blades 8. Consequently, in the event of mechanical failure in the primary pitch control system, sufficient forces can be applied by the secondary actuator 30 to force the blades 8 into the feathered condition.

Although the invention has been described with reference to adjustment of the pitch of the blades 8 to a feathered condition upon failure of the primary pitch control system, it will be appreciated that the back-up system can be configured to vary the pitch of the blades 8 to any desired default position.

Instead of, or in addition to, the bypass conduit 40 and the pressure relief valve 42, it would be possible to apply negative feed back to the pump 32 when the actuator 30 reaches its limit position, in order to adjust the swashplate angle to minimise unnecessary pumping of the hydraulic fluid. Also, it is possible to replace the swashplate pump 32 by a constant displacement pump such as a gear pump, with a valve being provided to supply the output of the pump either to the actuator 30 or to a bypass conduit which returns the fluid to the pump. The valve would then be controlled in response to a pressure signal transmitted on the conduit 48.

As an alternative to the pressure signal transmitted on the conduit 48, an electrical or other signalling technique could be used to transmit the failure signal to the rotating hydraulic circuit on the rotor 24.

Although the embodiment described with reference to FIGS. 3 and 4 utilises hydraulic actuation of the blades 8, it would be possible to utilise an electrical system. Thus, the secondary actuator 30 could be an electrical or electromagnetic actuator, and the power generating means could be a generator powered in a similar manner to that disclosed for the pump 32 in FIG. 4. The failure signal for such an electrical system could be a hydraulic signal, as indicated by the conduit 48 in FIG. 3, or it could be an electrical signal.

Although the invention has been described with reference to use in a propeller gas turbine engine as shown in FIG. 1, it will be appreciated that it could be employed in any propulsive unit utilising variable pitch blades. Furthermore, the invention could be employed in any rotation machine, where fully independent actuation of rotating components is required in the event of failure of a primary actuation system.

The invention claimed is:
1. A variable pitch rotor arrangement comprising:
a bladed rotor;
a primary actuator for displacing a component of the rotor under the control of primary control means;
a secondary actuator mounted on the rotor for displacing the component;
a power generating means at least partially mounted on the rotor,
the power generating means being drivable to generate power by rotation of the rotor relative to a further part of the arrangement; and
a secondary control means provided independent of the primary control means,
the secondary control means being responsive to a failure signal representing operative failure of the primary actuator, and being arranged to deliver power from the power generating means to the secondary actuator to displace the component.

2. A variable pitch rotor arrangement as claimed in claim 1, wherein the power generating means comprises an electrical generator.

3. A variable pitch rotor arrangement as claimed in claim 1, wherein the power generating means comprises a hydraulic pump.

4. A variable pitch rotor arrangement as claimed in claim 3, wherein the hydraulic pump is a swashplate pump comprising a swashplate controlled by the secondary control means.

5. A variable pitch rotor arrangement as claimed in claim 4, wherein the pump is permanently driven upon rotation of the rotor relative to the further part of the variable pitch rotor arrangement, the swashplate being displaceable from a non-inclined position to an inclined position in response to the failure signal.

6. A variable pitch rotor arrangement as claimed in claim 3, wherein the supply side and the delivery side of the pump are interconnected by a bypass duct provided with a pressure relief valve.

7. A variable pitch rotor arrangement as claimed in claim 1, wherein the power generating means is responsive to a pressure in a hydraulic circuit of the primary actuator, whereby the failure signal represents a value for that pressure below a predetermined value.

8. A variable pitch rotor arrangement as claimed in claim 1, wherein the component is a variable pitch blade which is displaceable by the primary and secondary actuators to vary the pitch angle of the blade.

9. A variable pitch rotor arrangement as claimed in claim 8, wherein the secondary actuator is operatively connected to the blade to displace the blade to a feathered condition in response to the failure signal.

10. A variable pitch rotor arrangement as claimed in claim 1, wherein the bladed rotor is one of a pair of contra-rotating rotors.

11. A variable pitch rotor arrangement as claimed in claim 10, wherein the power generating means is driven by relative rotation of the contra-rotating rotors.

12. A variable pitch rotor arrangement as claimed in claim 11, wherein the power generating means is mounted on one of the contra-rotating rotors and has an input shaft with a pinion engaging a ring gear on the other one of the contra-rotating rotors.

* * * * *